Figure 1:
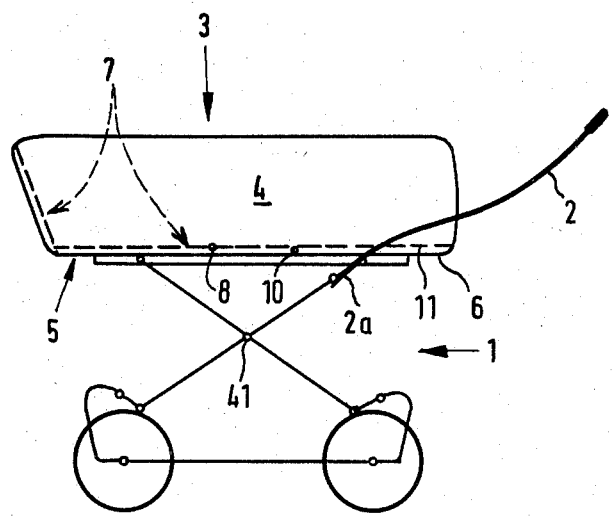

United States Patent [19]
Gesslein

[11] 3,871,701
[45] Mar. 18, 1975

[54] BABY CARRIAGE

[76] Inventor: Georg Gesslein, D-8621 Mannsgereuth, Post Beikheim, Kreis Lichtenfels/Oberfranken, Germany

[22] Filed: June 12, 1972

[21] Appl. No.: 261,674

[30] Foreign Application Priority Data
June 14, 1971 Germany............................ 2129449

[52] U.S. Cl...................... 296/28 B, 5/93 R, 296/26
[51] Int. Cl............................................. B62b 7/12
[58] Field of Search....... 296/1 B, 26, 28 B; 280/30, 280/31; 5/93 R, 93 B, 98 R, 99 R, 99 A

[56] References Cited
UNITED STATES PATENTS
3,466,678   9/1969   Glaser et al........................... 5/93 R
R23,488   4/1952   Raucher............................... 296/26

FOREIGN PATENTS OR APPLICATIONS
1,411,196   8/1965   France
620,725   3/1949   United Kingdom............... 296/28 B
821,140   9/1959   United Kingdom Primary Examiner—Robert J. Spar
Assistant Examiner—L. J. Paperner
Attorney, Agent, or Firm—Wolfgang G. Fasse

[57] ABSTRACT

A convertible baby carriage for accommodating a baby in the lying, sitting, kneeling and/or standing positions, having means to selectively increase the volume of a normally flat carriage body by raising its upper rim and/or lowering its bottom or part thereof at least at one body end which is preferably provided with coverable see-through portions.

20 Claims, 14 Drawing Figures

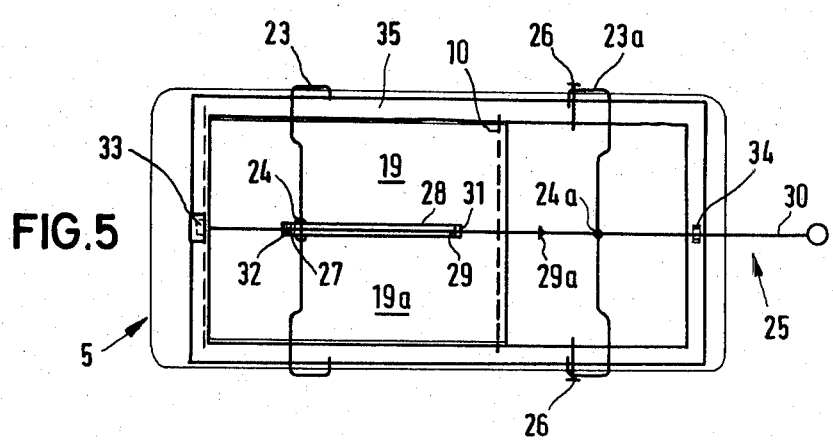
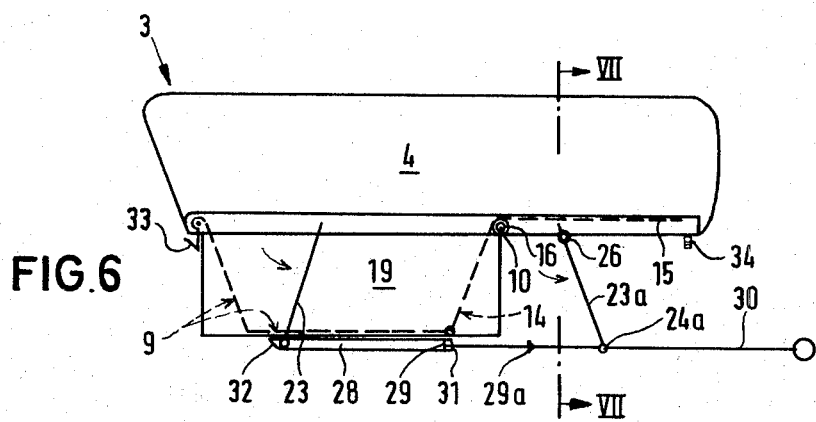
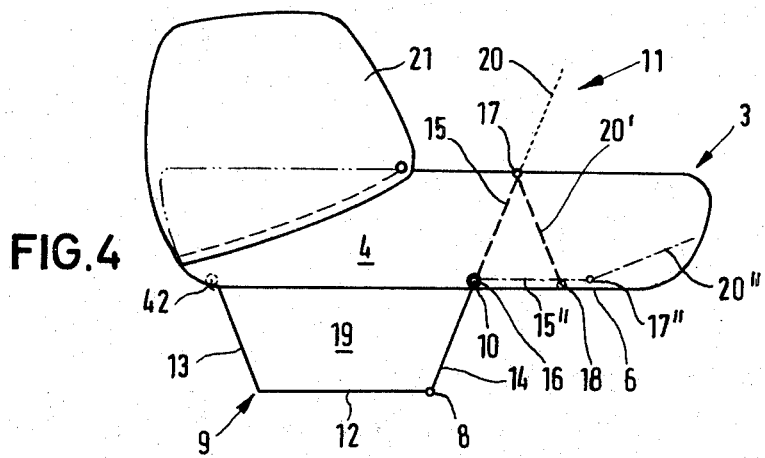

BABY CARRIAGE

FIELD AND BACKGROUND OF THE INVENTION

The invention relates to convertible baby carriages in general and more particularly to convertible baby carriages for selective use as a flat perambulator or as a stroller, including a carriage body having walls and a bottom which latter can at least partly be lowered, and including a detachable hood.

The terms "baby carriage" and "perambulator" or, for short, "pram" as used herein include baby carriages of all sorts, i.e., not only those having a box-shaped body, tub, trough, box, carrying bag or the like, but also strollers, baby strollers, toy prams, convertibles, etc.

Customary convertible baby carriages for selective use as a flat perambulator or as a stroller have detachable and/or collapsible parts. Thus, prior carriages can be converted by folding a back support and a foot rest into suitable positions. Very early baby carriages were designed with box sections that could be lowered or tilted down to serve as leg space for stroller use. Numerous different structures of this type have been manufactured, among them designs involving different carriage bodies to be attached to one and the same undercarriage.

The conventional convertibles are, however, relatively complicated both in manufacture and in use. In addition, they lack safety provisions in many respects. For instance it is usually dangerous for an infant of, say, eight ot ten months to stand or kneel in the baby carriage, since there is the hazard of the infant tipping over and falling to the ground whenever he bows over the upper rim. Another drawback is that a baby brought up in the face-down position as the normal way of sleeping will tend to kneel earlier and more often than an infant used to sleeping on his back, and that is in general little or no leg space available for the kneeling or standing positions.

For bringing up infants it has proved to be of considerable advantage to provide see-through portions in a baby carriage having at least one end that is higher than the rest of the carriage body. As yet, however, no baby carriages have been proposed or made that provide see-through portions in a convertible.

OBJECTS OF THE INVENTION

Accordingly, it is an important object of the invention to eliminate the disadvantages of the prior art and to provide a convertible baby carriage requiring a minimum of effort both in the construction and in the manufacture and permitting of maximum versatility and safety in use.

It is a further object of the invention to provide an improved convertible baby carriage of a simple, yet sturdy design suitable for rearing babies in either of the face-down and face-up positions, i.e. for accommodating an infant in the lying, sitting, kneeling and/or standing positions.

SUMMARY OF THE INVENTION

The invention provides a convertible baby carriage for selective use as a flat perambulator or as a stroller, including a carriage body having walls and a bottom which latter can at least partly be lowered, and including a detachable hood, comprising means for varying the overall height of at least one end of said carriage body to which said walls are attached both at the upper rim and at the lower rim thereof, said walls having transparent and coverable see-through portions arranged at the sides and at the front face of said one end.

In a convertible baby carriage of the type mentioned, the invention further provides means for varying the overall height at least of one end of said carriage body, including a lowering unit arranged to be moved between the walls of said body and equipped with side walls yieldingly connected to said carriage body and with an angled platform which is attached to a plane portion of said bottom by means of a pivot joint, means being provided for pivoting said angled platform around a horizontal hinge into a lower position where said angled platform is secured by means of a releasable detent.

By another aspect of the invention, a convertible baby carriage of the type mentioned comprises lowering means and support means for said carriage body, said support means including two brackets arranged to be extended from said carriage body such that said lowering means can be lowered whether or not said carriage body is detached from an undercarriage and set up by itself.

Yet another aspect of the invention relates to a baby carriage of the type mentioned, wherein said means for varying the overall height of at least one end of said carriage body include actuators attached thereto, said actuators comprising fluid power units arranged to be operated singly, by pairs or all together for extending the extensible parts of said carriage body.

Thus the invention provides very simple and very effective means for selectively increasing the useful volume of the carriage body as required so that the infant may lie, sit, kneel or stand in the carriage body without the safety hazards hitherto present. In contrast to earlier designs, a baby carriage according to the invention may comprise a normally flat structure with windows which warrant both free intellectual developement and ready inspection of the baby whenever wanted. In particular, these windows may be provided at the sides and at the front face of the carriage body end over whose total variable height they extend so that the see-through features are usuable independently of the carriage body volume in actual use.

Important advantages of the invention result from the convenience of increasing the useful volume of the carriage body merely by extending some parts thereof. This adds greatly to the utility of the pram. When extended, lowering means will accommodate the infant in the kneeling or standing position without safety hazard, the center of gravity being low. A fixed bottom part may serve as a seat, and side walls of the lowering unit guard the baby together with the walls of the carriage body. Consequently, a relatively flat carriage body will do, which is expedient in many respects, whereas earlier convertibles featured a deep body to the great annoyance of the grown-ups who had to handle the baby. By constrast, the invention affords all sorts of adjustments as required for easy handling and maximum comfort of the infant whose freedom of movement is enhanced to an unusual extent while his safety is guaranteed at any time. Moreover, the user will not depend on aids and appliances or on special training for effecting whatever variation may be wanted.

SHORT FIGURE DESCRIPTION

Figure 2:
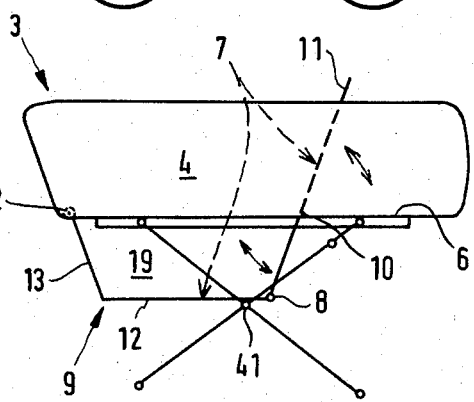
Figure 3:
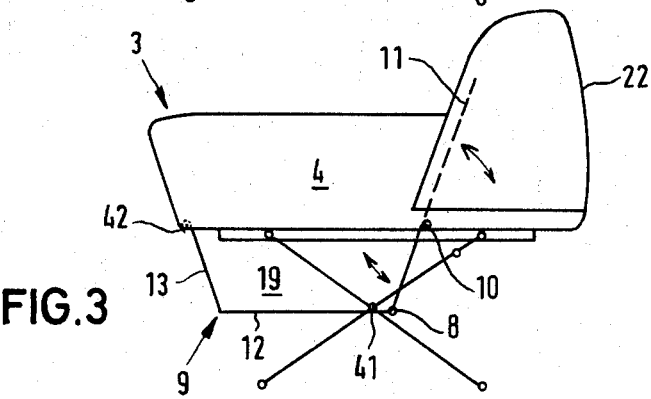
Figure 7:
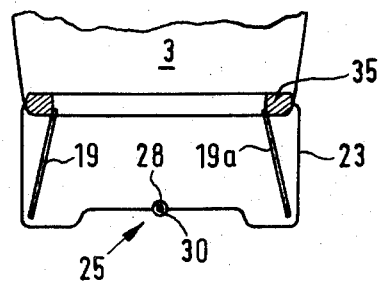
Figure 8:
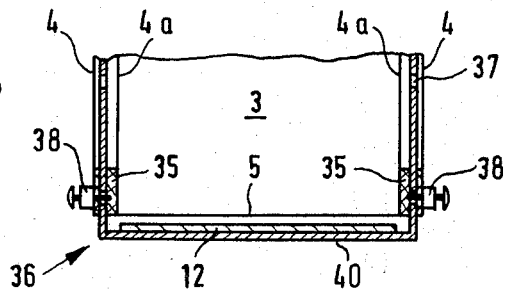
Figure 9:
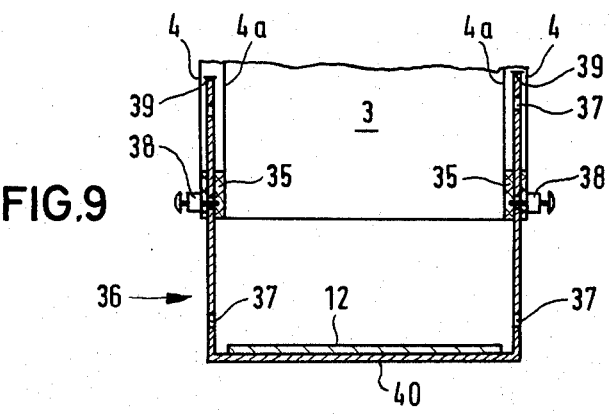
Figure 10:
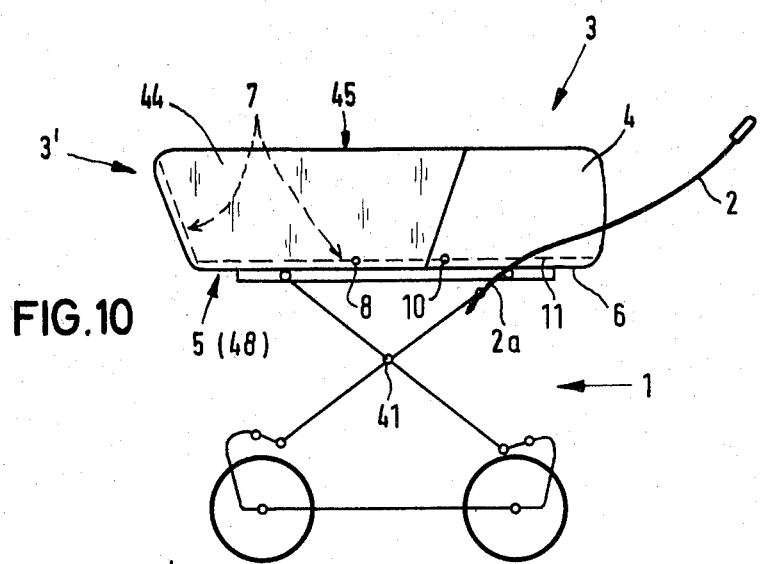
Figure 11:
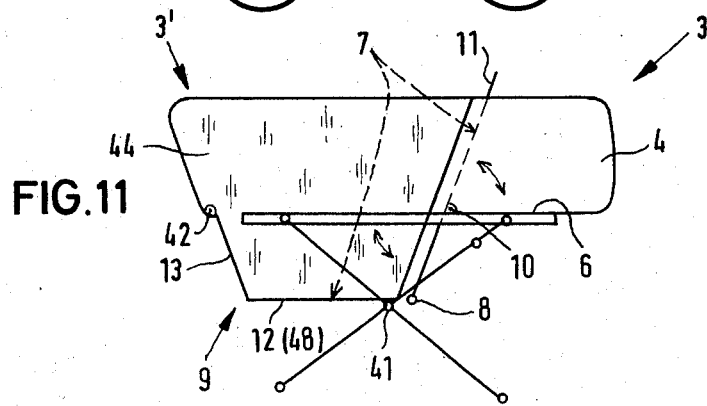
Figure 12:
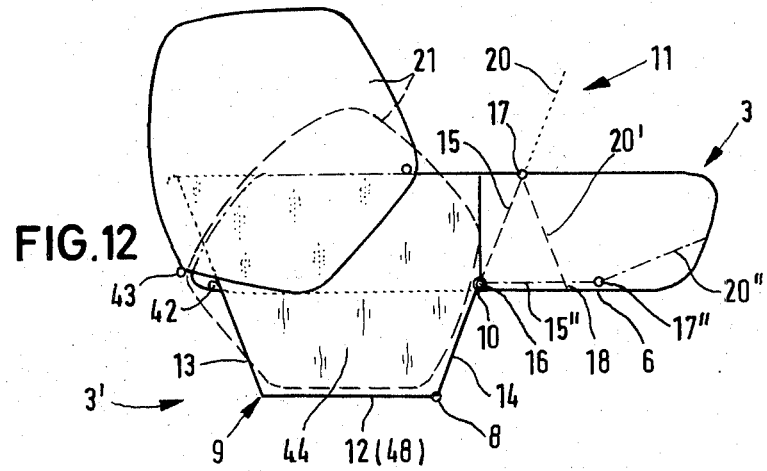
Figure 13:
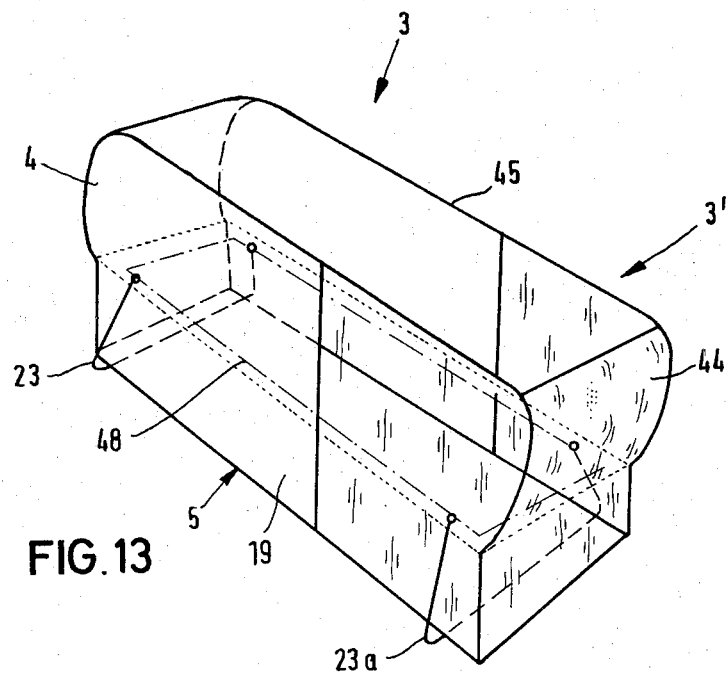
Figure 14:
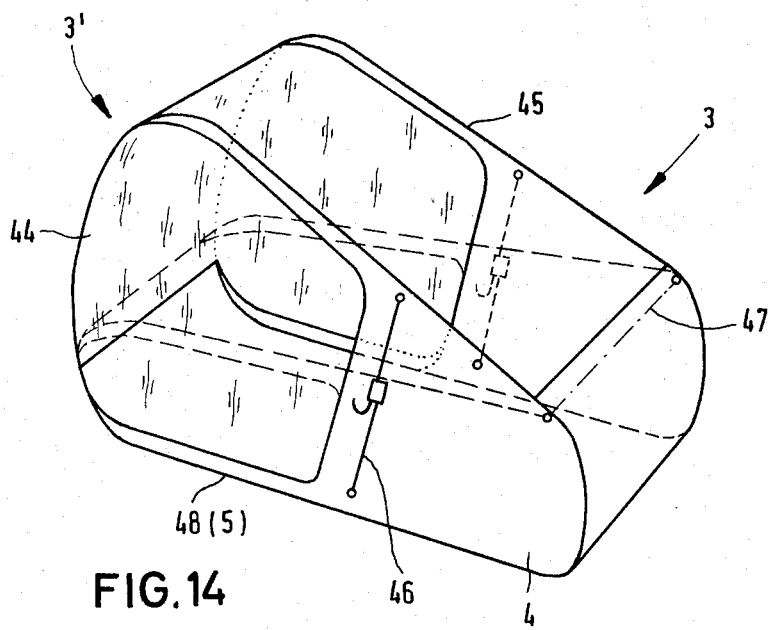

Other objects, features, details and advantages of the invention will become apparent from the following description of preferred embodiments illustrated in the drawings, wherein various commonly used pram parts are not shown since they are not subject of the present invention;

FIG. 1 is a simplified side elevation of a convertible baby carriage according to the invention, FIG. 2 is a similar side elevation of a baby carriage according to the invention used as a stroller, with several parts omitted for clarity, FIG. 3 is a similar side elevation of a carriage body having a higher end with see-through portions, FIG. 4 is a similar side elevation of a carriage body with a hood and hinged bottom parts, FIG. 5 is a view from below showing a carriage body detached for separate use on extended brackets, FIG. 6 is a side elevation of the carriage body in FIG. 5, FIG. 7 is a section view along the line VII-VII in FIG. 6, FIGS. 8 and 9 are section views showing parts of a carriage body according to another embodiment of the invention, with supporting brackets in retracted and an extended position, respectively, FIG. 10 is a simplified side elevation of a convertible baby carriage according to the invention used as a flat pram, FIG. 11 is a similar view of the carriage used as a stroller, FIG. 12 is a similar view of the carriage including a hood adapted to cover see-through portions of the carriage body, FIG. 13 is a simplified perspective view of a carriage body according to the invention with lowered bottom, and FIG. 14 is a simplified perspective view of a carriage body according to the invention with raised upper portions.

The pram shown in FIG. 1 includes an undercarriage 1 and a pusher handle 2 with an articulated lever 2a by means of which undercarriage 1 can be collapsed and set up in the usual way; the undercarriage 1 has a fulcrum 41 for the purpose. The undercarriage 1 supports a carriage body 3 which may be designed as a tub, carrying bag or the like having side walls 4 and a bottom 5. The latter may consist of a fixed or rigid portion 6 and a lowering unit 7 which comprises a pivot joint 8, an angled platform attached to that joint and a plane portion 11 adapted to be pivoted around a horizontal hinge 10. The angled platform 9 includes horizontal support 12 and an upwardly inclined portion 13 (FIG. 2).

The lowering unit 7 permits selective use of the baby carriage as a flat pram or as a stroller. For accommodating an infant in a lying position, the lowering unit 7 is retracted (FIGS. 1 and 10) so as to form part of the bottom 5, with the plane portion 11 on top of the fixed portion 6. If the baby is to be accommodated in a kneeling or standing position, the lowering unit 7 will be lowered as shown in FIGS. 2, 3, 4, 6, 11 and 12, the free end of the lowering unit 7 being secured in a snap-in detent 42 near the lower edge of the carriage body 3. Thus the lowered angled platform 9 is supported at its end opposite pivot joint 8.

The lowering unit 7 and/or its angled platform 9 is provided with side walls 19, 19a attached to the carriage body 3, e.g. by flexible or hinged connections. Thus there is a guard for the leg space of the infant.

At one of its ends the lowering unit 7 is connected to the hinge 10 and at its other end it is guided in the carriage body 3, such as in a pin guide or in a fork or slit guide (not shown) for the inclined portion 13. The pivoting motion of the plane portion 11 during extension and retraction of the lowering unit 7 is indicated by double arrows in FIGS. 2, 3, 11 and 12. The lower position shown there is especially suitable for a kneeling or standing infant resting on the support 12 and finding a handhold at the upper rim of the baby carriage 3 and at the upper end of the plane portion 11.

The embodiments of FIGS. 1 and 2 show a flat carriage body 3, while FIg. 3 features an embodiment with a see-through cockpit 22 that comprises the raised end of the carriage body 3. Such a see-through portion 22 is of special advantage for rearing babies in the face-down position. There, too, the lowering unit 7 is very useful in that a kneeling or standing infant may look over the upper end of the plane portion 11 through the cockpit 22 which simultaneously affords weather protection and which may also be provided with a customary hood.

The embodiment of FIG. 4 includes a particular hood 21 at one end of the carriage body 3, said one end being inclined or straightened down and comprising the angled platform 9 of the lowering unit 7 shown in the lower position. When retracted, the platform 9 closes the inclined or straigthened portion of the carriage body 3 such that the inclined portion 13 and the side walls 19, 19a of the lowering unit 7 complete the carriage body.

It will also be seen in FIG. 4 that the plane portion 11 comprises a base part 14 extending from the pivot joint 8 to the hinge 10 and further comprises an outer part 15 continuing the base part 14 from the hinge 10 on. The outer part 15 may be connected to the base part 14 by a hinge connection 16 having a sleeve enclosing the hinge 10 and may be braced by means of latches, pins, etc. (not shown). Similarly, the upper end of outer part 15 may have a joint 17 to which an extension part 20 may be attached and braced.

Such an extension part 20 may be adapted to be plugged onto the free end of the outer part 15. The embodiment of FIG. 4 permits folding the plane portion 11 so that the outer part - here designated by 15'' - may rest on top of the fixed portion 6 in the collapsed position indicated by chain-dot lines. As shown at 20'', the extension part may then form an upwardly inclined head rest or foot rest under which some storage space is available for depositing things only occasionally required. However, when the plane portion 11 is braced so that base part 14 and outer part 15 are in alignment, the extension part - now designated by 20' - may be fastened in or at a stop 18 for additional support. This position is indicated in FIG. 4 by dashed lines and is useful particularly for kneeling or standing infants, whereas the outer part 15'' and optionally the extension 20' will serve as a seat for the baby in the chain-dotted position.

In whatever position, the horizontal support 12, the inclined portion 13, the base part 14 and the longitudinal walls 19, 19a define an enclosed space safeguarding the baby whether the lowering unit 7 is in its retracted or in its extended position.

Futher embodiments of the baby carriage according to the invention are shown in FIGS. 5 to 7. It will be realized that the carriage body 3 can be detached from the undercarriage 1 and be set up by itself. For this purpose, frame 35 of the bottom 5 may be provided with pivotable brackets 23 and 23a which are connected to an actuator bar 25 by means of eyelet joints 24 and 24a, respectively.

The actuator bar 25 may consist of a tube 28 and a rod 30 with a handle. The rod 30 includes an inner stop 29 and an outer stop 29a cooperating with a flange 31 of the tube 28. When retracted, the brackets 23, 23a rest adjacent the bottom 5 of the carriage body 3 in an essentially horizontal position. For extension, the brackets 23, 23a will be pivoted in the direction indicated by curved arrows in FIG. 6, by pulling the actuator bar 25 against the force of a compression spring 27 engaged between the joint 24 and the latch or toe 32 of tube 28. Thus the toe 32 which had rested in a lock 33 will disengage.

When the actuator bar 25 is operated, rod 30 is advanced until the inner stop 29 engages the flange 31 of the tube 28. This advance effects an initial pivoting motion of the bracket 23a connected to rod 30 via joint 24a, even before the pivoting motion of the other bracket 23 begins. Then by continuing a pull at the actuator bar 25, both brackets 23 and 23a are commonly pivoted into the straddled position illustrated in FIG. 6 so that the carriage body 3 has a stable support.

As can be seen from FIGS. 6 and 7, the longitudinal walls 19, 19a of the lowering unit 7 may be plate sections hingedly attached to the longitudinal parts of frame 35. When the brackets 23, 23a are pivoted into the extended position (FIG. 6), these plate sections may drop down to provide space for the lower part (not shown in FIG. 7) of the lowering unit 7, i.e., for the angled platform 9 and the base part 14. Movement of the plate sections 19, 19a beyond the position indicated in FIG. 7 is then limited by bracket 23 forming a stop so that the lowering unit 7 is substantially shut off at the sides. Reference is made to stops 26 which limit the pivoting motion of at least bracket 23a and which are fastened to frame 35.

An alternative embodiment for use of the detached carriage body 3 as a separate unit is shown in FIGS. 8 and 9. It will be seen that the body 3 has double walls 4 and 4a between which the legs of a U-shaped flat bracket 36 are guided. Two of these brackets 36 extend through the frame 35 in holes thereof. Each of the brackets 36 is provided with holes 37 at certain distances for cooperation with spring-loaded snap-in pins 38 attached to the carriage body 3, e.g. at the level of frame 35. These snap-in pins 38 may engage the selected holes 37 of the brackets 36, for instance the lowermost holes (FIG. 8), so that bracket bases 40 are secured near the bottom 5. When the brackets 36 are extended (FIG. 9), the snap-in pins 38 may engage holes 37 farther up, e.g. in the intermediate position shown or in the top position where the pins 38 become locked in the topmost holes 37. Stops 39 serve to prevent extending the brackets 36 too far by engaging frame 35.

It should be mentioned that the support 12 of a lowered unit 7 is indicated in FIG. 8 and 9, whereas the other parts thereof are omitted for clarity.

From the foregoing description, it will be understood that the lowering unit 7 of a convertible baby carriage according to the invention may be designed as a minor part of the bottom 5 adapted to be lowered and enclosed by side walls 19, 19a which may consist of plastics sheet material, of fiberboard, of wood, etc. and which may or may not have a coating. The angled platform 9 and the plane portion 11 or its parts 14 and 15 as well as the extension part 20 may be made of the same material as the walls 19 or of a similar one; they may also be made of a support frame carrying a taut web, e.g. a fabric, a foil sheet, etc.

The carriage body 3 may comprise a detachable cockpit or end as indicated in FIG. 4 by a --- line. Also, the body 3 may include a see-through cockpit 22 and/or a hood 21. For use as a stroller, the outer part 15 may serve as a seat when the lowering unit 7 is extended.

For extending the extensible parts of the carriage body 3, particularly the lowering unit 7, fluid power units (not shown) may be attached to the carriage body 3. Such fluid power units, e.g. hydraulic cylinders, may be operated singly, by pairs or all together for extending the extensible parts. Actuating means may be fastened at the bottom 5, for instance at the underside of the fixed portion 6.

As illustrated in the embodiments of FIGS. 10 to 14, a convertible baby carriage of the invention may have a flat carriage body 3 one end 3' of which is provided with see-through portions 44 both at the sides and at the front face of end 3'. As pointed out above, such see-through portions 44 are particularly useful for rearing infants in the face-down position. Here, too, the lowered unit 7 permits a kneeling or standing baby to look over the upper end of the plane portion 11 through the windows 44 which also afford weather protection and whicy may be covered as required, e.g. by snap-on covers, pivotable flaps, etc. In addition, a hood may be provided which may also have see-through portions partly or wholly convertible.

In the embodiment shown in FIG. 12, the body 3 includes at its end 3' a hood 21 of special shape. At this end 3', there is also the angled platform 9 of the lowering unit 7 depicted in the lower position. When retracted (as indicated by dots), the angled platform 9 completes the carriage body 3 by the inclined portion 13 and the sidewalls 19 (FIG. 10). Whether in the retracted or in the extended position, the see-through portions 44 of the end 3' may be covered by the hood 3 which is adapted to be tilted down for the purpose, around a hinge 43, into the position shown by dashed lines.

The carriage body 3 of the embodiments shown in FIGS. 10 to 14 may also be detached from an undercarriage 1 and be set up by itself. In the example of FIG. 13 there are pivotable brackets attached to a frame or lower rim 48 of the bottom 5. Again, the brackets 23, 23a may be operated by a spring-loaded actuator bar similar to the one of FIGS. 5 to 7 and may be connected thereto by similar joints. When extended, the brackets 23, 23a are straddled to provide for stability of the detached body 3. As will be seen from FIG. 13, the carriage body 3 may be equipped with a continuous bottom 5 serving as the lowering unit, and with see-through portions 44 at the one end 3' extending over the total variable height thereof both at the sides and at the front face. These windows 44 may be of flexible material and may be partly or wholly covered as required.

A further modified embodiment is shown in FIG. 14. The upper rim 45 of the carriage body 3 may be pivoted around a pivot joint 47 from the normal position indicated by dashed lines into an elevated position drawn with full lines. To this end, lifting means may be provided comprising struts 46 similar to those commonly used on hoods. These struts 46 may be fixed to the side walls of the carriage body 3 at the upper and lower parts thereof. Preferably, the walls 4 have see-through portions 44 and are flexible and at least partly coverable. Another design (not shown) includes lifting means for all of the upper rim 45, e.g. by the use of a second pair of struts 46 arranged at each side of the carriage body 3 to substitute the pivot joint 47.

Again, the lifting means 46, 47 on the one hand and the lowering means on the other hand may be constructed to include U-shaped brackets of flat bars, the legs of which may be guided between double walls as illustrated in FIGS. 8 and 9 and may be provided with holes arranged at certain distances to cooperate with snap-in pins that are attached to the outside of carriage body 3 and that are spring-loaded for engagement in the holes.

It will be realized that the embodiments of FIGS. 10 to 14 may also be constructed of the materials specified above and may be equipped with fluid power units for extending the extensible parts of the carriage body 3. Any covers for the see-through portions 44 may be attached at the inside or at the outside of the body 3.

Although specific examples have been described and illustrated, it is to be understood that the invention is intended to cover all equivalents and modifications within the scope of the appended claims. The arrangements and types of structural components may be subjected to numerous variations.

I claim:

1. A convertible baby carriage for selective use as a flat perambulator or as a stroller, including a carriage body having walls and a bottom which latter can at least partly be lowered, comprising means for varying the overall height at least of one end of said carriage body, including a lowering unit arranged to be moved between the walls of said body, said lowering unit comprising side walls yieldingly connected to said carriage body a plane portion pivotally connected at the bottom of said carriage body for movement about a horizontal hinge, and an angled platform having a bottom portion and an inclined portion attached to said plane portion of said bottom by means of a pivot joint, whereby said angled platform is pivotable around said horizontal hinge between an upper position and a lower position, and a releasable detent for securing said inclined portion of said carriage body in said lower position, whereby said bottom portion remains substantially horizontal in said upper and lower positions.

2. A convertible baby carriage according to claim 1 wherein said angled platform comprises a horizontal support and an upwardly inclined portion.

3. A convertible baby carriage according to claim 1, wherein said plane bottom portion comprises a base part extending from said pivot joint to said hinge and further comprises an outer part attached to said base part.

4. A convertible baby carriage according to claim 3, wherein said outer part is rigidly connected to said base part.

5. A convertible baby carriage according to claim 3, wherein said outer part is hingedly connected to said base portion and wherein means are provided for bracing said hinge connection.

6. A convertible baby carriage according to claim 5, wherein said hinge connection includes sleeve means enclosing said pivot joint.

7. A convertible baby carriage according to claim 3, wherein means are provided for attaching to said outer part a collapsible extension part which can be fastened to a stop so as to serve as a support for said plane bottom portion and which can be folded selectively in front of said outer part or behind it.

8. A convertible baby carriage according to claim 1, wherein said plane bottom portion is constructed of hingedly connected plate sections.

9. A convertible baby carriage according to claim 1, wherein said plane bottom portion or at least its outer part comprises a support frame carrying a taut backing web.

10. A convertible baby carriage according to claim 1, wherein means are provided for supporting said lowering means in its lowermost position.

11. A convertible baby carriage according to claim 1, wherein releasable locking means are provided for securing said bottom in its upper position such that by releasing said locking means said bottom can be lowered into its lower position where it is suspended by said walls.

12. A convertible baby carriage according to claim 11, wherein said releasable locking means comprise pivotable elements and wherein means are provided for securing said bottom in its lower position both in the directions of its plane and in the directions normal thereto.

13. The convertible baby carriage of claim 1, further comprising a detachable hood mounted for selectively covering portions of said carriage body.

14. The convertible baby carriage of claim 1, further comprising selectively movable bracket means mounted on said carriage body for holding said lowering unit in its upper position.

15. The convertible baby carriage of claim 14, wherein said side walls comprise plate sections hinged to the bottom of said carriage body, and wherein said bracket means are pivotally mounted to said carriage body to extend under said carriage body and further comprising actuator bar means pivotally connected to said bracket means for selectively holding said bracket means in upper and lower positions, whereby in its upper position said bracket means hold said plate sections horizontally and thus said lowering unit in its upper position, and whereby in its lower position said bracket means releases said plate sections to hinge downwardly and thereby to release said lowering unit for movement to its lower position.

16. The convertible baby carriage of claim 14, wherein said side walls comprise double walls, and said bracket means comprise U-shaped brackets having ends extending between the double walls at opposite sides of said body and a bottom extending beneath said carriage body to hold said lowering unit, and further comprising means in said double walls for holding said ends of said brackets at selected positions below said carriage body.

17. The convertible baby carriage of claim 1, wherein at least a portion of the walls of said body are transparent.

18. The convertible baby carriage of claim 17, wherein the portions of the walls of said carriage body adjacent said lowering unit are transparent.

19. The convertible baby carriage of claim 18, further comprising an opaque hood pivotally mounted to said carriage body at one end thereof to selectively cover said side walls of said lowering unit and the adjacent walls of said carriage body.

20. A convertible baby carriage for selective use as a flat perambulator or as a stroller, said baby carriage comprising a carriage body having side walls and a bottom, said bottom including a lowering unit comprised of an angled platform having a horizontal portion and an upwardly extending portion on one end thereof, and a plane bottom portion, one end of said plane bottom portion being pivotally connected to the other end of said horizontal portion, means pivotally mounting said plane portion to the bottom of said carriage about a horizontal axis spaced from said one end thereof, whereby said plane portion may be moved to a first horizontal position with said angled platform positioned within the side walls of said carriage, and a second inclined position with said angled platform extending below the side walls of said carriage, and a releasable detent positioned to hold the upper end of said upwardly extending portion of said angled platform to the bottom of said carriage in the inclined position of said plane bottom portion.

* * * * *